United States Patent [19]
Weber

[11] 3,818,616
[45] June 25, 1974

[54] METHOD AND DEVICE FOR CAREER SELECTION

[76] Inventor: Gordon Weber, 153 Petrie Rd., Atwater, Ohio 44201

[22] Filed: Feb. 23, 1973

[21] Appl. No.: 335,031

[52] U.S. Cl. .................. 35/74, 40/70 R, 35/22 R
[51] Int. Cl. ............................................. G09b 1/22
[58] Field of Search .......... 35/74, 31 A, 35 F, 22 R; 40/70 R

[56] References Cited
UNITED STATES PATENTS

| | | | |
|---|---|---|---|
| 1,087,174 | 2/1914 | McNutt | 35/74 X |
| 1,177,652 | 4/1916 | Robertson | 40/70 R |
| 3,249,085 | 5/1966 | St. Jean | 35/74 X |

*Primary Examiner*—Wm. H. Grieb
*Attorney, Agent, or Firm*—Hamilton, Renner & Kenner

[57] ABSTRACT

Disclosed is a device and method of operation for the simplified ascertainment of the characteristics of various careers contained in a reference manual. The device consists of a front plate having a window, a rear plate, and a circular disc rotatably fastened therebetween. An occupational field of general interest or special aptitude is selected from the front plate. One or more of nine major occupational categories may be available within that occupational field and one may be selected by rotating the circular disc until the category appears in the window of the front plate. A numbered occupational division and first accompanying numeral is then selected from the circular disc. The first accompanying numeral is then located in the reference manual wherein all occupations have been arranged in a numerical sequence. A specific occupational title and second accompanying numeral is then selected from the reference manual. The second numeral may then be translated into characteristics of the selected occupation from a table on the rear plate of the device. Alternatively, more desirable characteristics may be translated into a numeral from the table and a new occupational title obtained from the reference manual.

7 Claims, 4 Drawing Figures

METHOD AND DEVICE FOR CAREER SELECTION

BACKGROUND OF THE INVENTION

One of the important roles of the educator in secondary school systems is that of counseling the student in the selection of a career. To supplement the standard consultations between the individual student and the guidance department, many schools have available visual aides including filmed material for presentation to groups or classes of students. Field trips are also organized for the students, giving them an opportunity to consider other careers. Additionally, many brochures are available which generally outline the facts and requirements pertinent to a chosen field. Perhaps the most complete and concise presentation of occupational information is contained in a publication compiled by the United States Department of Labor entitled the *Dictionary of Occupational Titles*, hereinafter referred to as the D.O.T.

The D.O.T. has categorized and described over 41,000 different jobs in two volumes. The jobs are divided into nine major occupational categories which are in turn subdivided into eighty-four occupational divisions. Further subdivision yields an occupational title having a code number of six digits for the identification of each specific job. While both volumes serve as a valuable reference to the guidance counselor, it is unlikely that more than a few students would have both the interest and the time to use them. For the other students, particularly those who are less concerned with selecting a career, a wealth of information is passed by as if for all practical purposes it were not available.

SUMMARY OF THE INVENTION

It is, therefore, a primary object of the present invention to provide a method and device for use in conjunction with the D.O.T. whereby a student may select a career according to his own interests.

It is another object of the present invention to provide a method and device for career selection which may be easily used in the classroom for instructional purposes and which presents the wide range of career possibilities in a pleasing, understandable way.

It is a further object of the present invention to provide a method and device for career selection whereby the student may readily explore many possible career selections according to his interests, aptitude, imagination and resourcefulness.

It is a still further object of the present invention to provide a method and device for promoting sufficient interest in career selection so that more students will refer to the D.O.T. and will then seek other resource materials.

It is yet another object of the present invention to provide a method and device by which most of the searching for occupational code numbers is performed without the D.O.T. as a result of which more students can utilize the D.O.T. for the specific information provided thereby.

These and other objects of the present invention which will become apparent from the following specification, are accomplished by means hereinafter described and claimed.

In general, a device embodying the concept of the present invention, operable according to the method thereof, for the simplified ascertainment of career characteristics contained in the D.O.T. includes a front plate having a window, a rear plate and circular disc rotatably fastened therebetween. The front plate provides a list of career fields each of which is related to two or more of nine major occupational categories. The circular disc further divides the nine major categories into the 84 intermediate occupational divisions contained in the D.O.T. The rear plate contains a table which may be used to determine general characteristics of the specific occupational titles contained in the D.O.T. from the occupational code numbers.

The device may be operated by selecting an occupational field of general interest or aptitude from the front plate. As each field is related into two or more of the major occupational categories, the circular disc is rotated until the desired category appears in the window at which time all pertinent occupational divisions, within the category, also appear. Accompanying each occupational division is a first or two digit numeral which may be readily located in the D.O.T. wherein a specific occupational title is obtained accompanied by a second or six digit numeral. The second numeral may then be translated into characteristics of the selected occupational title from the rear plate of the device.

A preferred embodiment of the device suitable for practicing the method of the present invention to ascertain characteristics of various occupations is shown by way of example in the accompanying drawings and described in detail without attempting to show all of the various forms and modifications in which the invention might be embodied; the invention being measured by the appended claims and not by the details of the specification.

DESCRIPTION OF THE PREFERRED EMBODIMENT

Figure 1:
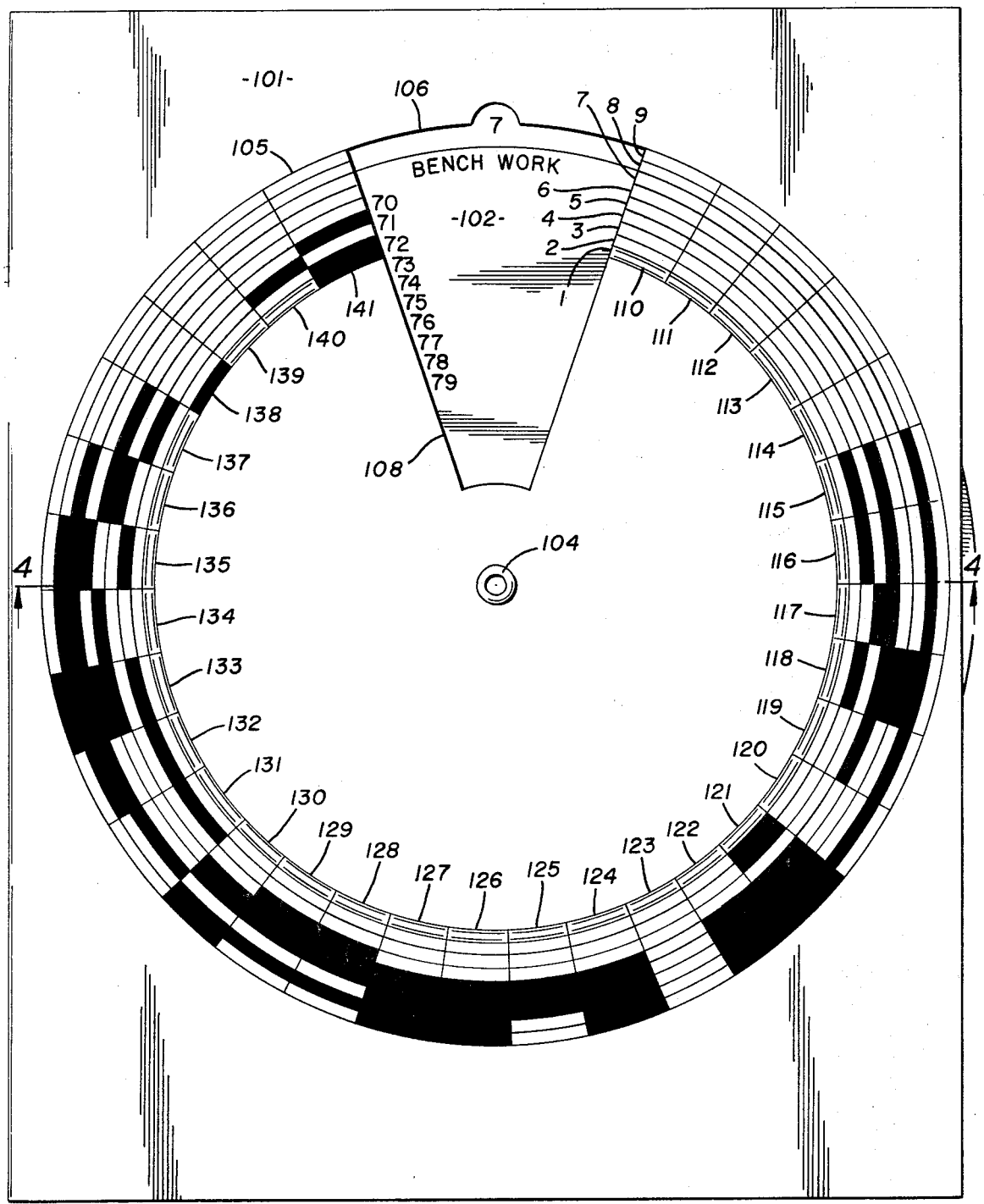
FIG. 1 is a plan view of the assembled device showing the front plate.
Figure 4:
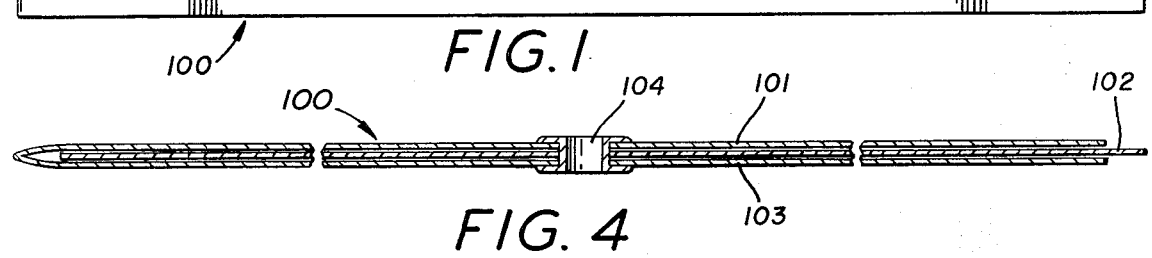
FIG. 4 is a sectional view taken substantially along the line 4—4 of FIG. 1.

Referring more particularly to the drawings, the device which may be made of metal, plastic, cardboard or other suitable material is indicated generally by the numeral 100. The device 100 includes a front plate 101, a circular disc 102, a rear plate 103 and a fastener 104 rotatably mounting disc 102 between plates 101 and 103.

As seen in FIG. 1, plate 101 has an annular band 105 which is discontinuous at 106 wherein a window 108 is provided. Band 105 is divided into 32 truncated segments 110–141 each of which represents one or more career fields printed within each segment. Thus segment 110 represents Business and Finance; 111 — Supervisor and Manager; 112 — Clerical and Office; 113 — Testing Appraisal, Investigating and Inspection; 114 — Sales, Customer Service, Merchandising and Marketing; 115 — Writing; 116 — Art; 117 — Music; 118 — Entertaining; 119 — Communication Media; 120 — Photography; 121 — Humanities; 122 — Counseling; 123 — Education and Training; 124 — Consumer and Homemaking Education; 125 — Public Service; 126 —

Social Work; 127 — Law; 128 — Hospitality and Recreation; 129 — Personal Service; 130 — Health, Medicine and Nursing; 131 — Science and Mathematics; 132 — Environment; 133 — Marine Science; 134 — Farming, Fishing and Forestry; 135 — National Resources; 136 — Transportation; 137 — Construction; 138 — Operator Elemental manual; 139 — Machining, Manufacturing, Repair; 140 — Engineering, and segment 141 represents Skilled Crafts.

*The Dictionary of Occupational Titles*, Vol. II, *Occupational Classification and Industrial Index*, 1965, or D.O.T. Vol. II, classifies over 41,000 different jobs into nine major job categories. Accordingly, each of the segments 110 - 141 may be divided into nine narrow bands 1 to 9 representative of the nine D.O.T. major occupational categories and in this manner the occupational categories related to any selected career field are readily ascertainable. The radially innermost band, band 1 may correspond to the category, Professional, Technical, Manager; the next band, 2 corresponds to Clerical and Sales; 3 to Service Occupations; 4 to Farming, Fishing and Forestry; 5 to Processing Occupations; 6 to Machines and Trades; 7 to Bench Work Occupations; 8 to Structural Work and 9 to Miscellaneous Occupations.

It will be noted that none of the bands 1 to 9 are continuous between all adjacent segments, i.e., bands 1 to 9 traverse segments 110 – 114 inclusive, but only bands 1, 2, 4, 6, 7 and 9 traverse segments 115 and 116. By this arrangement the user of the device 100 learns that job titles in all nine occupational categories are available for instance in the field of business, segment 110, but that in the field of writing, segment 115, which is devoid of bands 3, 5 and 8, Service, Processing and Structural Work respectively, such categories are either non-existent or have been classified elsewhere.

Figure 2:
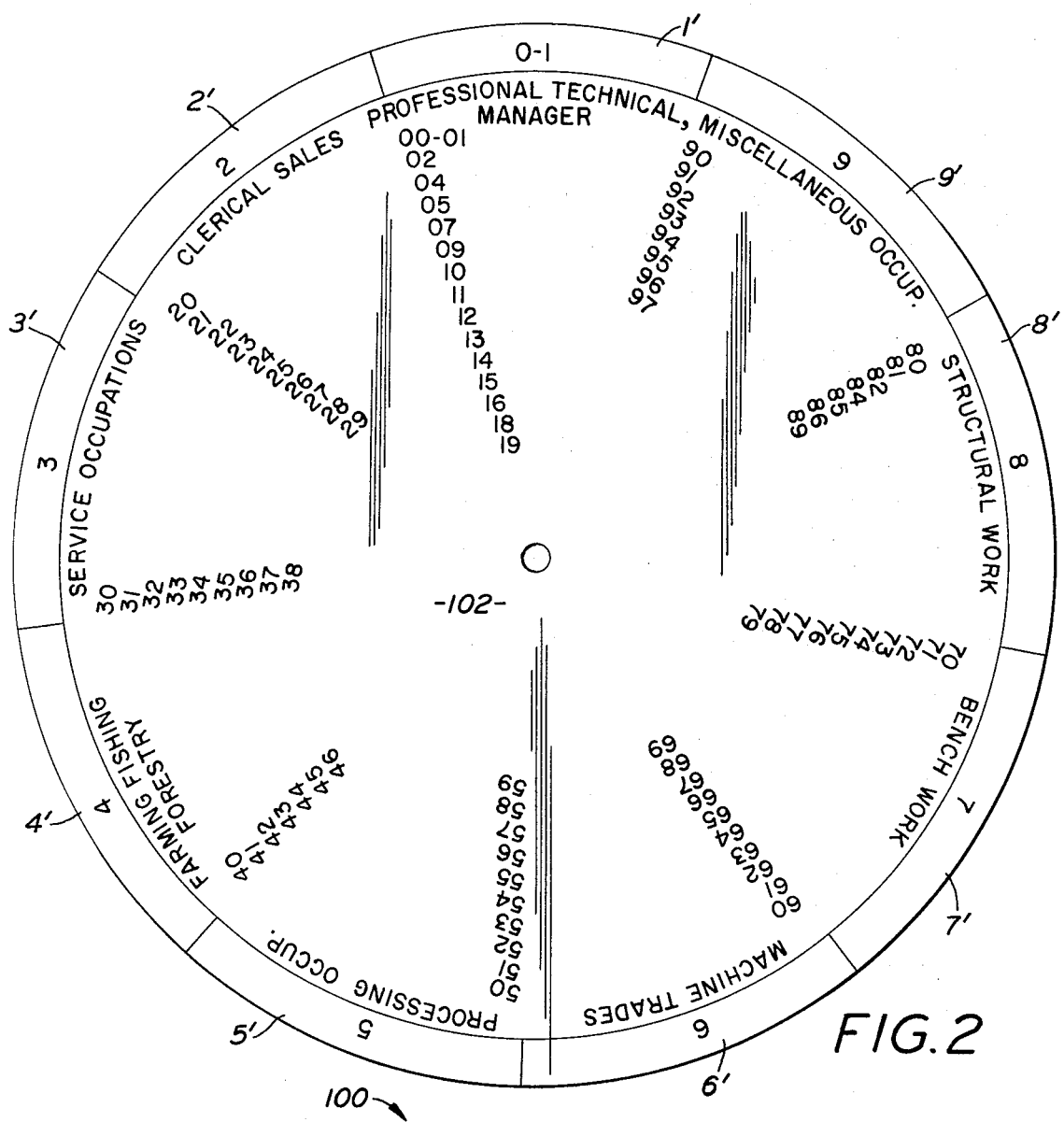
FIG. 2 is a plan view of the circular disc of the device.

Referring now to FIG. 2, the disc 102 is divided into nine truncated segments 1' to 9' arranged so that any given segment may be viewed through the window 108 in plate 101. Each segment is identified by a numeral which corresponds to one of the narrow bands appearing on plate 101 which in turn corresponds to a major occupational category. Thus, segment 1' corresponds to band 1 or the category Professional Technical Manager and therefore the segment 1' of the disc 102 bears the numerals "0–1." The use of two numerals in the first segment will be explained herein below. Likewise segment 2', bearing the numeral "2," corresponds to band 2 and so on through and including segment 9'.

It is preferable to color the bands 1–9 and at least a portion of the segments 1'–9' using one color per category. By so doing the device 100 becomes easier to use and is also more attractive to the student. A suggested color scheme could be as follows: segment 1' and band 1 white; segment 2' and band 2 pink; segment 3' and band 3 brown; segment 4' and band 4 yellow; segment 5' and band 5 orange; segment 6' and band 6 red; segment 7' and band 7 violet; segment 8' and band 8 blue and segment 9' and band 9 green. For purposes of clarity, the discontinuities in bands 1–9, as seen in FIG. 1, have been filled in solid.

It will also be noted that each segment 1' to 9' is subdivided by sequential groups of two digit numbers. Each number refers to an intermediate occupational division from the D.O.T. Vol. II. In segment 1', two sets of intermediate divisions appear, i.e., classifications from 00–09 and from 10–19, hence the designation upon the circular disc 102 is "0-1." The remaining segments each contain one set of intermediate divisions and therefore one numeral. These divisions are printed out on the disc following the appropriate number, there being 84 of said divisions as follows:

Under segment 1':

00—01 Architect and Engineer

02— Mathematics and Physical Science

04— Life Science

05— Social Science

07— Medicine and Health

09— Education

10— Museum, Library and Archives

11— Law

12— Religion and Theology

13— Writing

14— Art

15— Entertainment and Recreation

16— Administration

18— Manager, Official

19— Miscellaneous Technical, Manager and Professional.

Under segment 2':

20— Stenography, Typist and Clerical Work

21— Computing and Account Recording

22— Materials and Production Recording

23— Information Distribution Jobs

24— Miscellaneous Clerical Work

25— Salesmen — Services

26—  
27— } Salesman — Commodity  
28—

29— Merchandising.

Under segment 3':

30— Domestic Service Occupations

31— Food and Beverage Work

32— Hotel and Related Work

33— Barbering and Cosmetology

34— Amusement and Recreation

35— Other Personal Service

36— Apparel and Furnishing Service

37— Protective Service

38— Building Service

Figure 3:
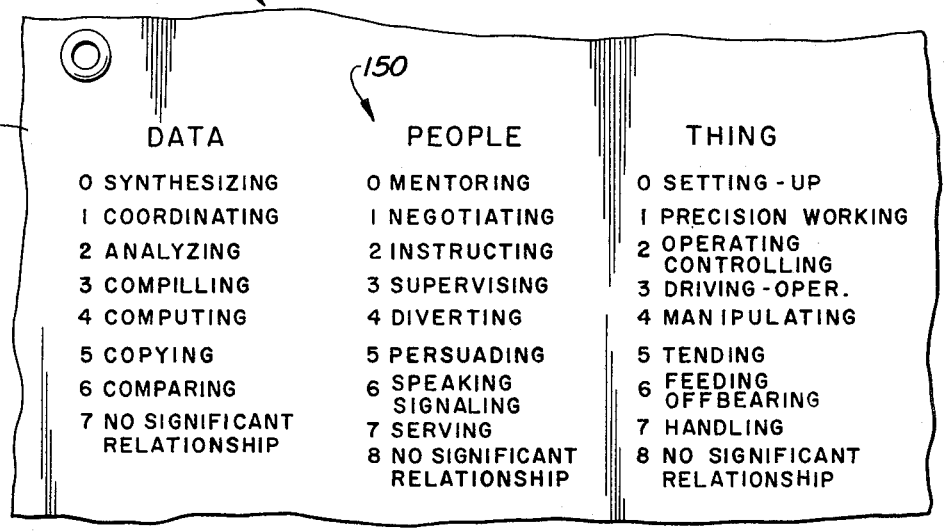
FIG. 3 is a plan view of a portion of the rear plate of the device.

Under segment 4':

40— Plant Farming
41— Animal Farming
42— Other General Farming
43— Fishery and Related Jobs
44— Forestry Occupations
45— Hunting, Trapping and Related
46— Agricultural Services Under segment 5':

50— Metal Processing Occupations
51— Ore Refining and Foundry Jobs
52— Food and Tobacco Processing
53— Paper Processing Jobs
54— Oil, Coal and Gas Processing
55— Chemical Processing
56— Wood and Wood Products Processing
57— Stone, Clay, Glass Processing
58— Leather and Textile Processing
59— Miscellaneous Processing Under segment 6':

60— Metal Machining Occupations
61— Other Metal Working Trades
62— ⎱ Mechanics and Machine
63— ⎰         Repairmen
64— Paperworking Jobs
65— Printing
66— Wood Machining
67— Stone, Clay, Glass Machines
68— Textile Machining
69— Other Machines Trades Under segment 7':

70— Fabricating, Assembly, Repair of Metal Products
71— Precision Instrument Assembly and Repair
72— Electrical Equipment Assembly and Repair
73— Miscellaneous Assembly and Repair of Materials
74— Painting and Decorating
75— Synthetic Products Repair and Manufacturing
76— Wood Products Manufacture and Repair
77— Stone, Clay, and Glass Manufacturing
78— Leather and Textile Manufacturing
79— Other Bench Work Occupations Under segment 8':

80— Metal Fabricating Occupations
81— Welding and Related Occupations
82— Electrical Assembly and Repair
84— Surface Covering, Painting, etc.
85— Excavating, Grading, Paving
86— Other Construction Work
89— Other Structural Workers Under segment 9':

90— Motor Freight Occupations
91— Other Transportation Work
92— Packaging and Materials Handling
93— Minerals Extraction Jobs
94— Logging Occupations
95— Utilities Industries Jobs
96— Other Amusement and Recreation
97— Graphic Art Work Referring now to FIG. 3, the rear plate 103 may be provided with a table, indicated by the numeral 150. The table 150 is divided into three columns to provide information pertaining to selected occupations. The first column is headed "DATA" and is subdivided into eight general characteristics, numbered 0–7, relating to the manner in which a person might deal with data. For instance, the numeral 2 would indicate that a particular job would require the analysis of data. The second column is headed "PEOPLE" and is subdivided into nine general characteristics, numbered 0–8, relating to the manner in which a person might deal with people, e.g., the numeral 3 would indicate the supervision of people as a characteristic. The third column, headed "THINGS," is subdivided into nine general characteristics, numbered 0–8, relating to the manner in which a person might deal with things, e.g., the numeral 7 would indicate the handling of things as a characteristic. The use of the numerals from the table 150 will become apparent in the preferred method of operation of the device 100 which is hereinafter described.

According to one method of operating the device 100, the student, having no particular occupation in mind, would first scan the annular band 105 for a career in a field of particular interest. Assuming that Personal Service, segment 129, was of interest, the student would readily detect the related bands 1, 2, 3, 7 and 9 therein, providing him with the major occupational categories available in Personal Service, i.e., professional — band 1; clerical — band 2; service occupations — band 3; bench work occupations — band 7 and miscellaneous occupations — band 9. Of these the student may desire service occupations, band 3. Accordingly, he rotates disc 102 until the truncated segment 3' bearing the numeral "3," appears in window 108, and he is presented with nine of the 84 intermediate occupational divisions contained in the D.O.T. Vol. II.

It will be remembered that each of the occupational divisions is accompanied by a first or two-digit numeral corresponding to the numeral given to that division in the D.O.T. Vol. II. If then, the student were to be interested in Barbering, the numeral 33 on the dial would tell him to look under 33 in the D.O.T. Vol. II. Occupational divisions in the D.O.T. Vol. II may be further subdivided into 10 occupational groups numbered 0 through 9, adding a third digit to the occupational code number, i.e., 330–339.

The complete code number for Barbering, as it appears in the D.O.T. Vol. II is 330.371. The three digits following the decimal point are keyed to characteristics of the specific occupation which may be determined from the D.O.T. Vol. II, or the rear plate 103 of the device 100. The first numeral following the decimal point, a 3, refers to the DATA column of table 150 and indicates that one engaged in Barbering might compile data. In like manner, the second numeral, a 7, indicates serving under the column headed PEOPLE, and the third numeral, a 1, indicates precision working under the column headed THINGS.

As is explained in the D.O.T. Vol. II, the last three digits generally refer to relationships which bear significantly upon the job, while the daily encounters with data, people and things which have little effect on the performance of the job are not reflected. It should be clear that with a six digit numeral system for 41,000 jobs, many of the numbers have not yet been used. Nevertheless, it is often possible for a student to select three digit combinations from the table 150 which correspond to more desirable work characteristics and then focus his attention on occupational code numbers bearing the same numerals and thereby locate other careers. Thus a student having located the code number for a dental hygienist, 078.368, translates that number into compiling data and speaking to people from the table 150. If that student realizes that he or she would rather not work with people, the fifth digit, 6 of the number 078.368, could be substituted by an 8 (no significant relationship between people and such a job). Upon returning to the D.O.T. Vol. II, the student need only search for a number whose fifth digit is 8 such as 078.687, the code number for a medical or dental laboratory assistant.

Having once found a career compatible with his interests, the student may then consult other sources with or without the help of the guidance department to gain further information. Thus the device and method for operation reduces the time that a student would normally spend using the D.O.T. Rather than initially searching the manual for a three digit numeral representative of an occupation, the student is able to ascertain the first two digits according to his own interests by using the device. Having done so, he need only review a column or perhaps a page of the manual for all the related job titles. Not only has the time saved resulted in the accessibility of the manual to a greater number of students, but also, the device will stimulate interest in students who otherwise lack the motivation to devote time and research into career study.

I claim:

1. A device to simplify the ascertainment of the characteristics of various careers contained in and selected from a reference manual wherein each career is identified by a numbered occupational title, digested within a numbered occupational division having a plurality of numbered occupational titles thereunder and further digested within a numbered occupational category having a plurality of numbered occupational divisions thereunder, said device comprising: a front plate having a set of concentric bands peripherally located thereon and divided into a plurality of first arcuate segments, wherein each said concentric band relates to one of the numbered occupational categories and each said first arcuate segment represents a career field, said front plate being further provided with a window; a rotatable plate underlying said front plate and having indicia thereon divided into a corresponding number of truncated segments as said concentric bands, wherein each said truncated segment has a second arcuate segment containing one numbered occupational category, and has the related numbered occupational divisions therebelow, said indicia being arranged so that all of the numbered occupational divisions related to a given occupational category may be selectively viewed through said window in said front plate; a rear plate and a fastening means for rotatably mounting said rotatable plate between said front plate and said rear plate.

2. A device as in claim 1, wherein said set of concentric bands numbers nine, each said concentric band having a different identifying color, and wherein said plurality of first arcuate segments numbers thirty-two and each said first arcuate segment contains at least two of said concentric bands.

3. A device as in claim 1, wherein said plurality of second arcuate segments numbers nine, and each said arcuate segment has a different identifying color.

4. A device as in claim 1, wherein said rear plate underlies said rotatable plate and has a second indicia thereon to translate a numbered occupational title from the reference manual into several groups of characteristics related thereto wherein said second indicia comprises: a table having three classifications which may be used to determine characteristics of the selected numbered occupational title.

5. A device as in claim 4, wherein said three classifications relate to data, people and things and each of said classifications is numerically divided into at least eight subdivisions.

6. A method for using a career selecting device having a front plate with a plurality of occupational categories thereon and having a window therein, a rotatable plate with a plurality of numbered occupational categories and a plurality of numbered occupational divisions thereon, a rear plate with numbered clsssification material thereon and means for rotatably fastening said rotatable plate between said front and said rear plate, to ascertain the characteristics of various occupational titles from a reference manual divided into numbered, occupational categories, divisions and titles, comprising the steps of: selecting an occupational category from the front plate, rotating the rotatable plate between the front and rear plates until the desired numbered occupational category and divisions appear in the window of the front plate, selecting a numbered occupational division and first accompanying numeral from the window, looking through the reference manual and locating said first numeral therein. selecting a specific occupational title and second accompanying numeral from the reference manual, turning the career selecting device over, and translating said second numeral into characteristics of the selected occupational title from the numbered classification material thereon.

7. A method for using a career selecting device as in claim 6 comprising the further steps of: compiling said second accompanying numeral from the numbered classification material and using said second numeral to determine a numbered occupational title from the reference manual.

* * * * *